United States Patent [19]

Hidaka et al.

[11] Patent Number: 4,862,512

[45] Date of Patent: Aug. 29, 1989

[54] SCANNING TYPE IMAGE READING APPARATUS

[75] Inventors: Shinobu Hidaka, Sagamihara; Katsumi Miwa, Machida; Masato Higashi, Sagamihara, all of Japan

[73] Assignee: Minolta Camera Kabushiki Kaisha, Osaka, Japan

[21] Appl. No.: 208,791

[22] Filed: Jun. 20, 1988

Related U.S. Application Data

[63] Continuation of Ser. No. 942,280, Dec. 16, 1986, abandoned.

[30] Foreign Application Priority Data

Dec. 20, 1985 [JP] Japan .................. 60-288092

[51] Int. Cl.$^4$ .......................... G06K 9/20; G06K 9/22
[52] U.S. Cl. .......................... 382/58; 382/59; 382/67; 358/471
[58] Field of Search .............. 382/58, 59, 67; 358/294

[56] References Cited

U.S. PATENT DOCUMENTS 4,742,559  5/1988  Fujiwara et al. .............. 382/59

FOREIGN PATENT DOCUMENTS

| 57-96370 | 6/1982 | Japan . | |
|---|---|---|---|
| 0010272 | 1/1983 | Japan | 382/59 |
| 58-10273 | 1/1983 | Japan . | |
| 0173683 | 9/1985 | Japan | 382/58 |
| 0238981 | 11/1985 | Japan | 382/59 |
| 0254283 | 12/1985 | Japan | 382/59 |
| 0170874 | 8/1986 | Japan | 382/59 |

Primary Examiner—James J. Groody
Assistant Examiner—Michael D. Parker
Attorney, Agent, or Firm—Burns, Doane, Swecker & Mathis

[57] ABSTRACT

The present invention relates to a scanning type image reading apparatus. The image reading apparatus includes a generator for generating serial signals each time when the scanning system is driven by a predetermined degree, and a line sensor of the reading apparatus is caused to execute the image read out operation upon reception of said signals. The read-out image data by the line sensor is compensated in response to the detected moving speed of the scanning system detected at every predetermined degree.

15 Claims, 5 Drawing Sheets

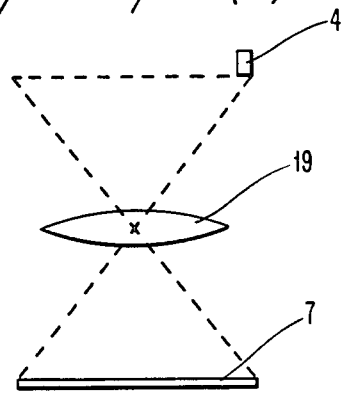
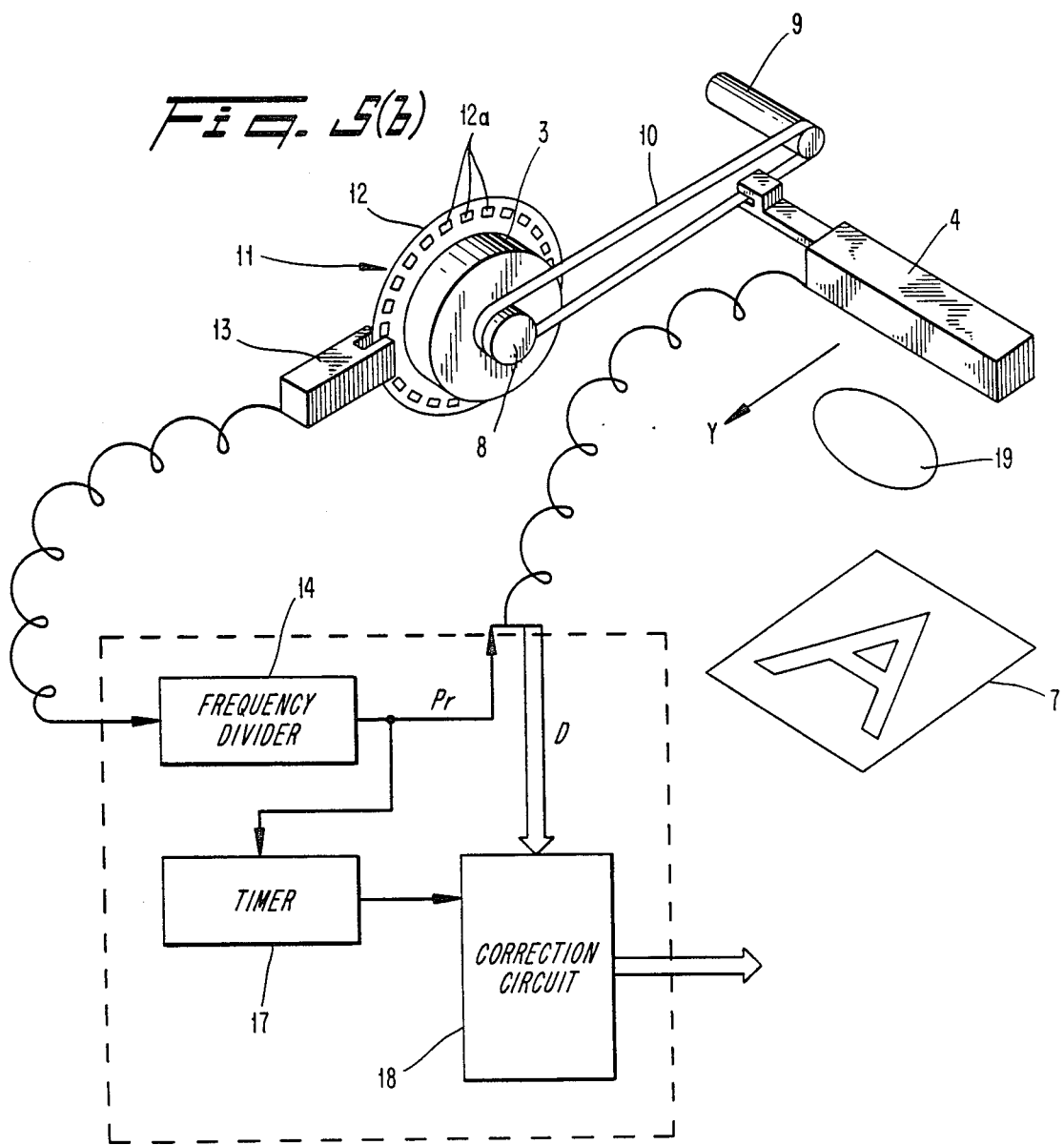

SCANNING TYPE IMAGE READING APPARATUS

This application is a continuation, of application Ser. No. 942,280, filed Dec. 16, 1986 now abandoned.

BACKGROUND OF THE INVENTION

1. Field of the Invention

The present invention concerns generally with scanning type image reading apparatuses using line sensor means wherein a plurality of photosensitive elements are arranged in line or the like arrangement, and more particularly with read-out data processing circuitry means adopted therein.

2. Description of the Prior Art

Conventional image reading apparatuses are arranged generally as shown in the block diagram of FIG. 1 of the accompanying drawings, by way of a preferred example. This example illustrates a conventional scanning type image reading apparatus. In this FIG. 1, numeral 100 represents a scan start signal generator which delivers a SOS-signal upon depression of a push button, not shown, on an operational panel also not shown.

The term "SOS" means "start of scan" as used throughout the present specification. In addition, the term "scan" means "scanning". Numeral 200 represents a scan motor drive circuit, while 300 represents the scan motor. Numeral 400 represents a CCD-line sensor comprising a number of CCD-sensors arranged in line, as an example, while 500 represents a CCD-driving circuit; 600 a clock pulse generator and 700 an original document.

With this arrangement, when the start button is depressed, a scan start signal "a" will be delivered from the generator 100 and fed to CCD-drive circuit 500, which acts thereupon, in synchronism with the operation of the scanning system, to deliver an instruction signal to CCD-line sensor 400. Based upon this instruction, CCD-line sensor 400 will then initiate read-out operation of original image on the document. The read-out timing is controlled and determined by use of clock pulses CP to be delivered from the generator 600 at predetermined constant cycles. In addition, the scan-start signal "a" is fed also to scan start drive circuit 200 for initiation of driving energization of scan motor 300. With energization of the latter, the scanning system is caused to move in the scanning direction which is perpendicular to the lengthwise direction of CCD-line sensor 400. In this way, the sensor 400 will execute the image read-out operation, covering the overall area of the original document image.

In this conventional image reading apparatus so far shown and described, the image-reading time period per one scanning line by the line sensor, or more specifically, moving time per scanning line, is controlled to a predetermined duration, as being fixed by clock pulses CP having constant duration periods. If there be certain mechanical troubles or errors in the scanning system, causing certain fluctuation in moving operation to occur therein by variation in the drive mode of the scan motor 300, the line pitch or more specifically the scanning length per line may naturally be subjected also to fluctuation. FIG. 2 represents schematically such variation in the line pitching as may be frequently and conventionally met with by uneven moving operation in the scanning system. In this drawing, X represents the lengthwise direction of the line sensor; Y represents the scanning direction. P1, P2, P3 . . . show successive line pitches.

When the line pitches are subjected to variation, disadvantageous distortion may take place in the read-out image, resulting in adverse effect in the image reproduceability which constitutes naturally a grave problem in the art.

This problem could be dissolved by improving the moving preciseness in the scanning system towards removal of moving fluctuations. In fact, however, it is impossibly difficult to remove such mechanical errors to a satisfying degree. In addition, adoption of such measures brings a tremendous increase of manufacturing cost.

SUMMARY OF THE INVENTION

An object of the present invention is to provide an improved image reading apparatus, capable of removing otherwise appearing read-out image distortions by making the scanning line pitches constant as possible, even if there be a fluctuation in movement at the scanning system embodied.

A further object is to provide an improved image reading apparatus of the above kind, still capable of removal as possible of occurrence of fluctuation in image density which may otherwise frequently appear when adopting counter measure against scanning line pitch fluctuation.

Still further object is to provide an improved image reading apparatus of the above kind, having a simplified structure and capable of reducing its production cost to a substantial degree.

For fulfillment of these and still further objects of the present invention, it is proposed to fit the apparatus with such means as producing a CCD-drive pulse each time when the scanning system is driven by a predetermined degree and with such a line sensor which is caused to execute the image read-out operation upon reception of said drive pulse, so as to make correction to the read-out image data by the line sensor, and indeed, by reliance of the pitches of said CCD-drive pulses.

These and further objects, features and advantages of the invention will become more apparent from the following description thereof taken in conjunction with the accompanying drawings which illustrate a specific embodiment of the invention.

BRIEF DESCRIPTION OF THE DRAWINGS

In the following description, like parts are designated by like reference numbers throughout the several drawings.

FIG. 5(a) is a schematic drawing showing the positional relationship between the CCD-line sensor and the original document.

FIG. 5(b) is an illustrating, half-perspective and half-blocked combined drawing of a scanning system employed in the image reading apparatus shown in FIG. 3.

DETAILED DESCRIPTION OF PREFERRED EMBODIMENTS

In the following, preferred embodiments of the present invention will be described with reference to the accompanying drawings, especially FIGS. 3-7.

Figure 1:
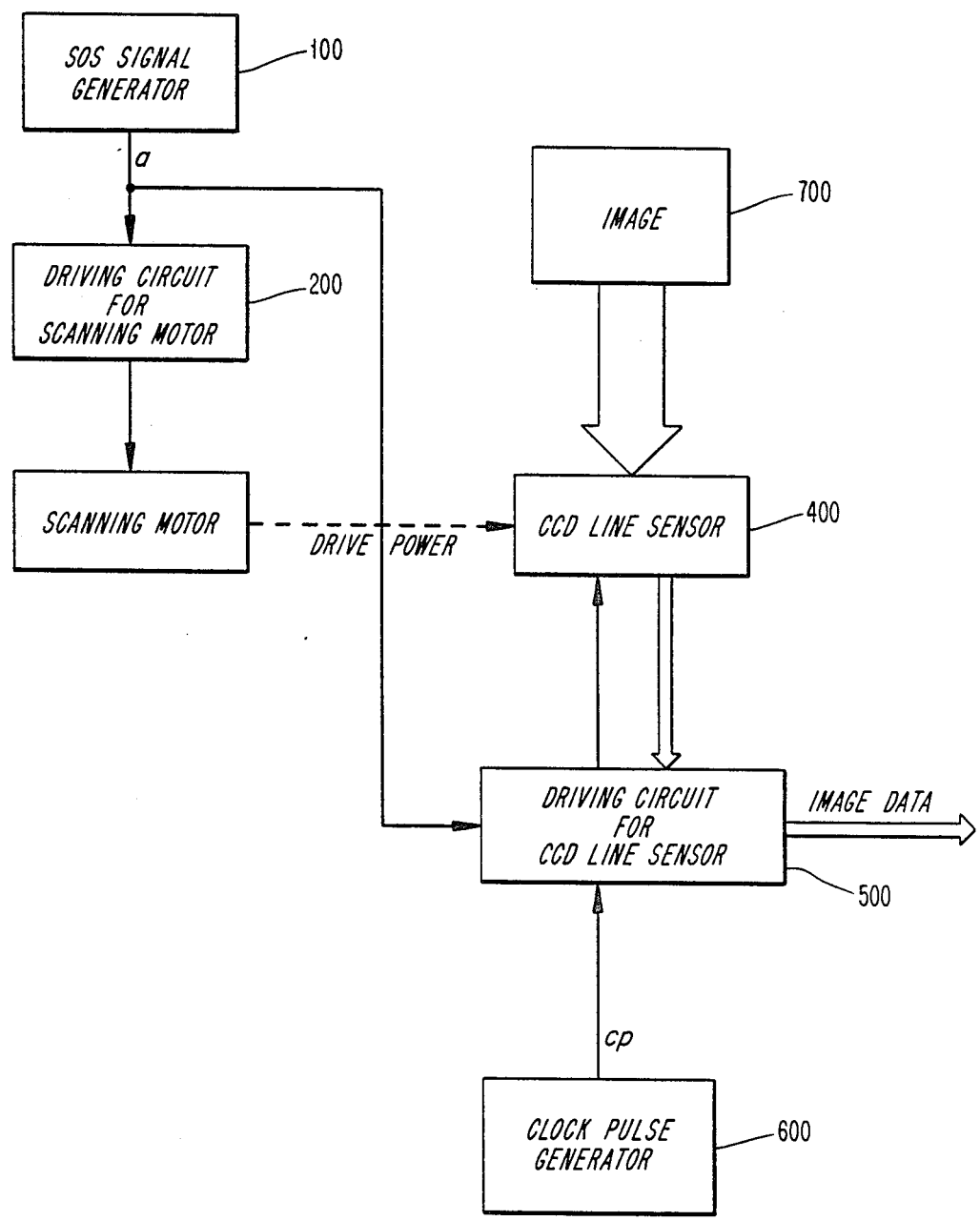
FIG. 1 is a block diagram for the illustration of a conventional image reading system.
Figure 2:
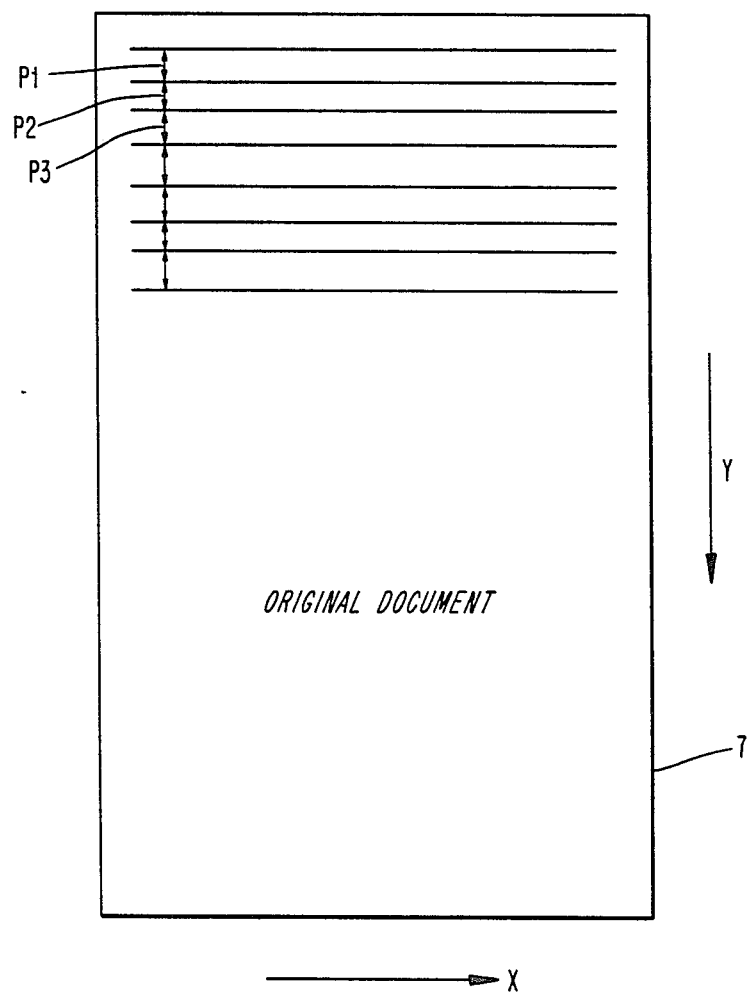
FIG. 2 is an illustrating drawing for showing of a salient technical problem inherent in prior art.
Figure 3:
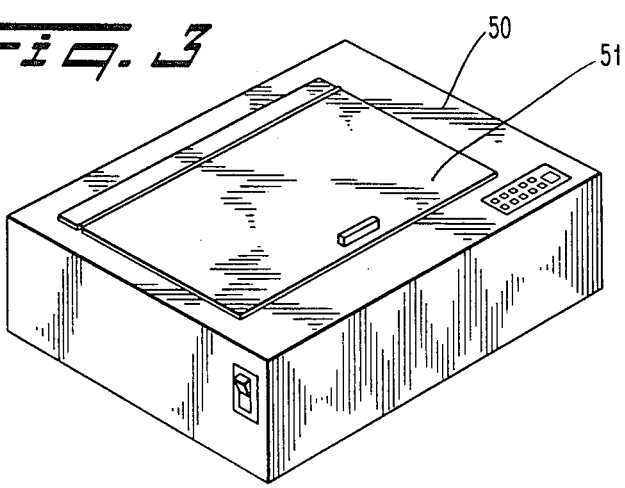
FIG. 3 is a general perspective outline sketch of a preferred embodiment of the inventive image reading apparatus.

In FIG. 3, an embodiment of the inventive image reading apparatus is shown at 50, only in its general out-line configuration in a perspective view. On the upper surface of this apparatus, there is provided a conventional platen which is however, covered by an openable cover 51, and thus not visible.

Figure 4:
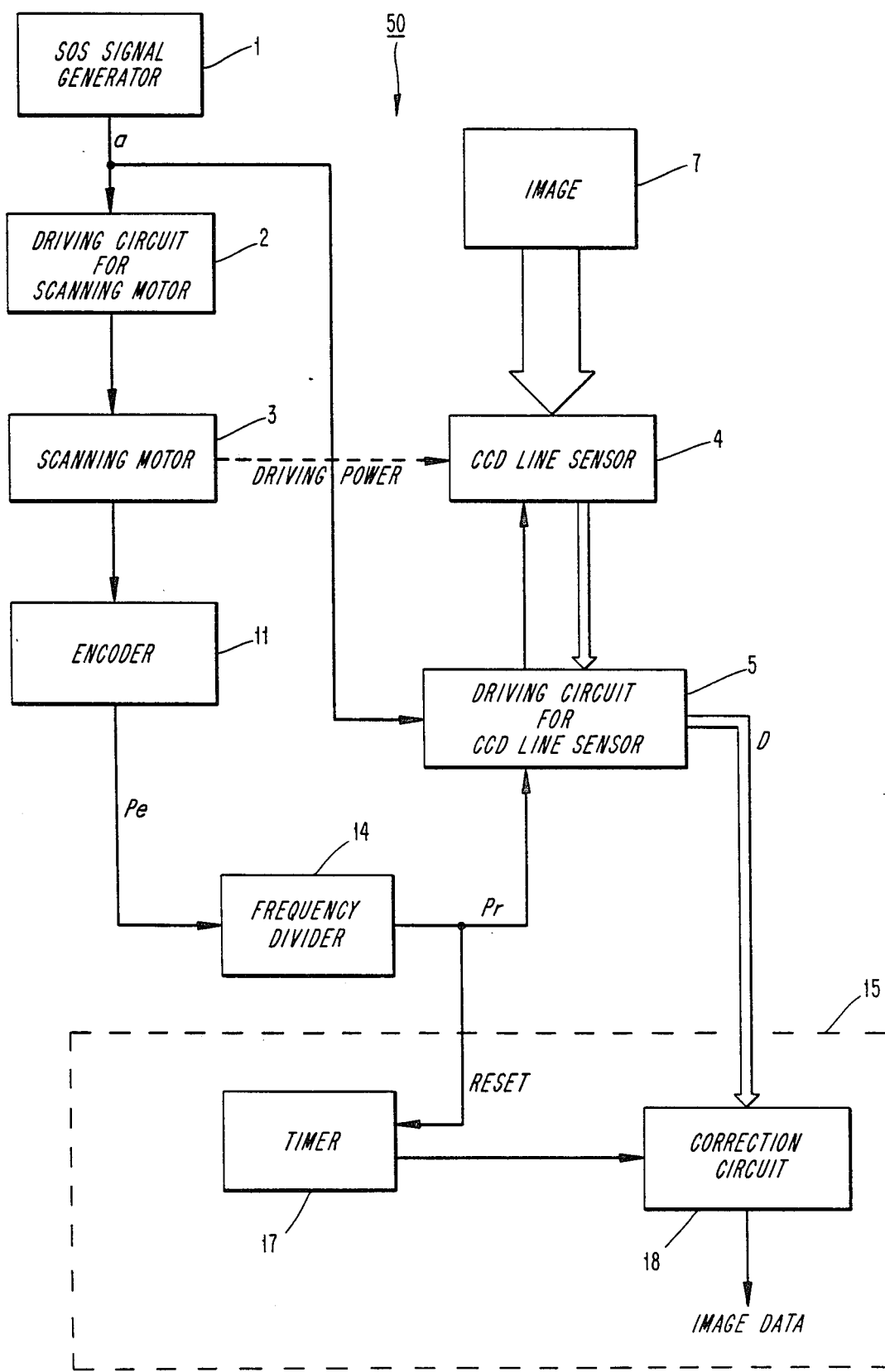
FIG. 4 is a block diagram of the image reading apparatus shown in FIG. 3.

In FIG. 4, numeral 1 represents a SOS-signal generator. The term "SOS" herein used throughout the present specification to represent "start of scan", as is commonly known among those skilled in the art.

Numeral 2 represents a driving circuit for a scanning motor 3.

Numeral 4 represents a CCD-line sensor, as a representative and preferred embodiment of the line sensor.

Numeral 5 represents a CCD-driving circuit; and 7 is the original document.

In FIG. 5(a), original document 7 is also shown. Image on the document 7 is projected through a projector lens 19 onto an image-focusing plane, shown only by a horizontal dotted line. As shown, the line sensor 4 is positioned on this focusing plane.

As shown more specifically in FIG. 5(b), CCD-line sensor 4 is fixedly attached to an endless belt 10 which is tensioned around and between a drive pulley 8 and a driven pulley 9, said drive pulley being fixedly attached to the shaft, although not specifically shown, of the scanning motor 3. With energization of scanning motor 3, thus, the sensor 4 will be moved in the scanning direction shown by an arrow Y, and on and along the forcussing plane. Naturally, the scanning direction is perpendicular to the lengthwise axial direction of scanning line sensor 4.

At this stage of description, however, caution must be taken to such point that in FIGS. 5(a) and 5(b), sensor 4 and document 7 are shown in an up-and-down reversedly relative position only for the purpose of better understanding of the invention.

Further, numeral 11 represents a pulse encoder which comprises a disc 12 having a number of peripheral perforations as at 12a, and a photoelectric converter 13 cooperating therewith. Photoelectric converter 13 comprises an illuminator section and a light-receiver section, these both being provided at the forward end portion of the converter 13 and positioned so as to squeeze the perforated periphery of disc 12 with ample idle gap, as shown in FIG. 5(b) in their perspective view.

The disc 12 is fixedly attached to output shaft, being not visible in the drawing, of the scanning motor 3. With each predetermined partial rotation or each one step rotation of scanning motor 3, a pulse will be delivered from photoelectric converter 13, and so on. The thus resulted pulses are fed to a frequency divider 14, the output pulses therefrom being conveyed to CCD-drive circuit 5, for serving as CCD-drive pulses for CCD-line sensor. More specifically, these drive pulses are those which define the reading operation timing. Thus, when each one of these pulses is fed to CCD-drive circuit 5, CCD-line sensor will read out of an image portion corresponding to a single scanning line.

Numeral 15 represents correction means adapted for making correction to the read-out image data D delivered through said CCD-drive circuit 5 from CCD-line sensor 4. The correction means comprises a timer 17 adapted for measurement of light reception time period of CCD-line sensor 4 for each scanning line, and a correction circuit 18 adapted for correcting either increasingly or reducingly the read-out data based upon the light reception time period of CCD-line sensor 4 for each scanning line, as measured at the timer 17.

Figure 6:
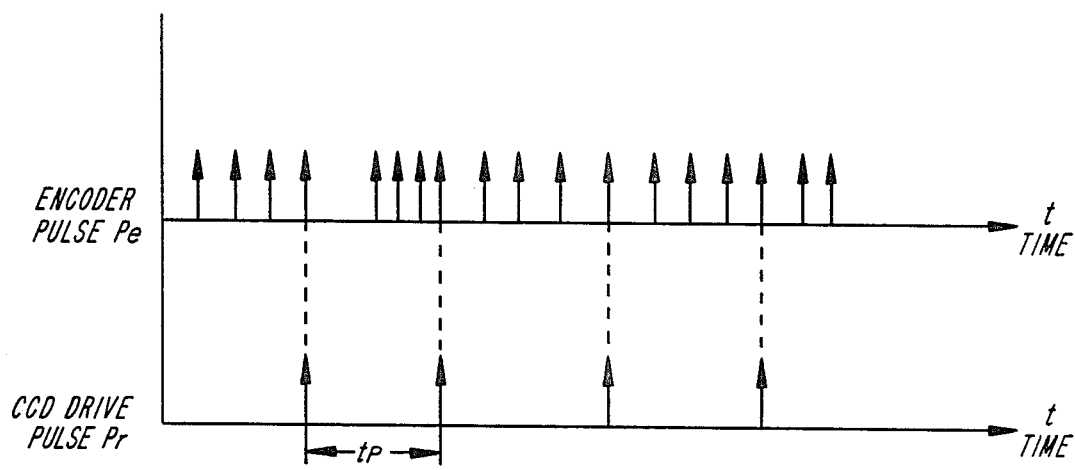
FIG. 6 is an exemplary timing chart of CCD-drive pulse series employed in the present invention.

In the operation of the foregoing arrangement, when a scan-start signal "a" is delivered from the signal generator 1, CCD-line sensor 4 will receive a CCD-drive signal, as in the same conventional way, and, at the same time, scanning motor 3 is caused to start. In this case, however, the timing for CCD-line sensor 4 to read the image of the document is different from the conventional. More specifically, it is defined by the CCD-drive pulse Pr which has been derived from the output pulse Pe from pulse encoder 11 by frequency division. The pulse Pr is delivered in proportional relationship with one step rotational movement of scanning motor 3. Thus, if there be fluctuation in the movement speed of the scanning system, the CCD-drive pulses will vary correspondingly in pulse pitches. FIG. 6 shows such variation of a CCD-drive pulse signal Pr relative to an output pulse signal Pe of pulse encoder 11 by taking as an example.

However, even if the pulse pitch of Pr is subjected to alteration, the line pitch will be stabilized regardless of the movement variation of the scanning system, because of such fact that CCD-drive pulse is delivered each time when the scanning motor 3 has been driven to a predetermined partial rotational degree, resulting thereby in removal of otherwise invited distortion of the read-out image.

The read-out data D taken by said CCD-line sensor 4 is fed from CCD-drive circuit 5 to correction means 15, for issuance of each CCD-drive pulse. At this stage, it should be noted that with variation of pulse pitch tp in the read-out pulse signal Pr, the light reception time duration at the CCD-line sensor varies for successive scanning lines and unfavourable occurrence of a variation of image density may be feared. In fact, however, such occurrence in the above sense is positively prevented by the provision of correction means 15. More specifically, the timer 17 of correction means 15 measures said pulse pitch tp of CCD-drive pulse, or in other words, the light-reception period of CCD-line sensor 4 for each scanning line. If the thus measured value is longer than the prescribed one, correction is made by correction circuit 18 in the reducing direction, and vice versa. In this way, output image density obtainable through correction means 15 may be desirously even.

Figure 7:
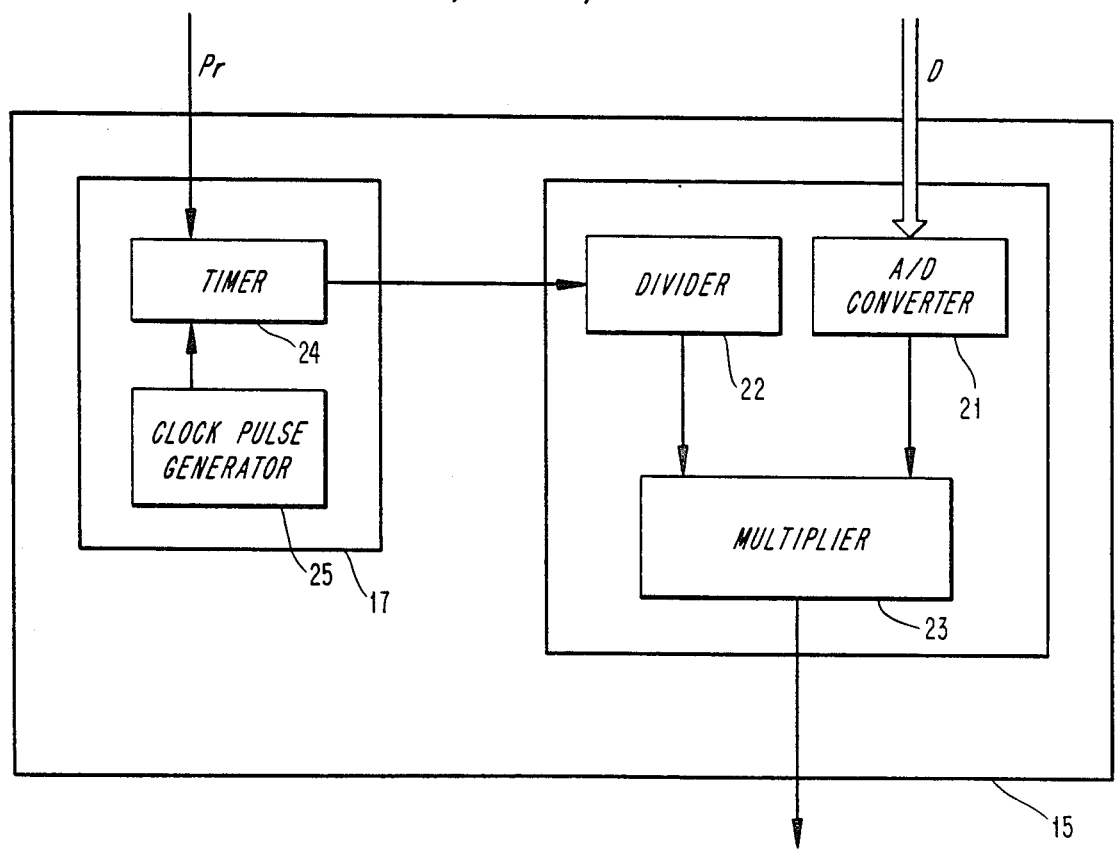
FIG. 7 is a block diagram showing detailed composition of the correction means employed in the system shown in FIG. 4.

Referring finally to FIG. 7, more detailed structure and function of said correction means 15 will be set forth.

Timer 17 comprises a counter 25 and a reference clock or more specifically clock pulse generator 25 adapted for generation of reference clock pulses of predetermined constant pulse pitches. Counter 24 counts the number of reference pulses fed from the clock 25 and is caused to reset upon arrival of the rising edge of a CCD-drive pulse fed from said frequency divider 14. In this way, timer 17 measures pulse pitch tp of the CCD-drive pulse Pr or more specifically the light-reception time period of CCD-line sensor 4 for each scanning line.

On the other hand, correction circuit 18 comprises a divider ZZ; a A/D converter Z1 and a multiplier 23. Divider 22 measures the ratio between the output from said counter 24, representing the pulse pitch of CCD-drive pulse, and the predetermine value described in the foregoing. A/D converter 21 is designed and arranged to convert the read-out data D fed from CCD-drive circuit 15 into an 8-bit digital signal (0-255). Multiplier 23 executes a multiplication of the read-out data D converted into a digital signal in the aforementioned way by A/D converter 21 and by the output from divider 22, for the purpose of execution of desired correction of said data D.

In the following, a practical numerical example will be set forth for the purpose of better understanding of nature and function of the correction means 15.

Now assuming, $V = 1.25$ inch/sec;

V: moving speed (design value) of CCD-line sensor 4 in the scanning direction.

$fe = 2$ kHz;

fe: frequency of output pulses Pe from encoder 11.

$fr = 500$ Hz;

fr: frequency of CCD-drive pulses (or in other words, frequency divider 14 divides output pulses Pe by ¼).

$fa = 500$ kHz;

fa: output's frequency of reference clock 25.

Under the above assumption of the values of V, fe, fr and fa, and when CCD-line sensor moves in the scanning direction at the predetermined speed of 1.25 inch/sec, the output "c" of counter 24 will be 1,000 pulses. The preset value at divider 22 will be 1,000.

It is now further assumed that a gray-colored document image with which the read-out data D must represent a digital value 128, is being scanned at a speed of 1.2125 inch/sec which is slower 3% than the design value, then the value of output from A/D converter 21 will be 131. Similarly, the frequency fe of output pulses Pe from encoder 11 will be 1.94 kHz. The frequency fr of CCD-drive pulses Pr will be 485 Hz. As a result, output value of counter 24 must be 1030. Therefore, output from divider 22 will be 1000/1030, and, at the multiplier 23, the resulted calculation will be: 131×1000/1030. Thus, the read-out data have been subjected to a correction to 127.

Results of similar calculations made under similar assumptions and including the foregoing specific example, have been tabulated in the following Table 1. Under these assumptions, scanning speed differentials from the prescribed value are: $-3\%$; $-2\%$; $-1\%$; $+1\%$; $+2\%$ and $+3\%$, respectively.

TABLE 1

| I | $-3\%$ | $-2\%$ | $-1\%$ | $\pm 0$ | $+1\%$ | $+2\%$ | $+3\%$ |
|---|---|---|---|---|---|---|---|
| II | 1.2125 | 1.225 | 1.2375 | 1.25 | 1.2675 | 1.275 | 1.2875 |
| III | 1.94K | 1.96K | 1.98K | 2K | 2.02K | 2.04K | 2.06K |
| IV | 485 | 490 | 495 | 500 | 505 | 510 | 515 |
| V | 1030 | 1020 | 1010 | 1000 | 990 | 980 | 970 |
| VI | 131 | 130 | 129 | 128 | 126 | 125 | 124 |
| VII | 127 | 127 | 127 | 128 | 127 | 127 | 127 |

Remarks:
I speed variation rate.
II moving, speed, inch.
III frequency of encoder output pulses, kHz.
IV CCD-drive pulse frequency, Hz.
V counts "c" at counter 24.
VI read-out data before correction.
VII read-out data after correction As for the correction circuit 18, it is only necessary to execute thereat a calculation to determine the ratio between the predetermined design value and the time signal delivered from timer 17 and a performance to correct either increasingly or decreasingly, as the case may be, the read-out data, depending upon the ratio as determined upon the ratio as determined in the above-mentioned way. For this purpose, a suitable soft style arrangement with use of a microcomputer may be adopted. Or alternatively, a suitable hard style arrangement with use of logic circuit means can be utilized. In the case of the soft style arrangement, either a line memory capable of memorizing the image information of one scanning line, or an image memory capable of accumulating one page image information, may be fitted in the correction circuit explained hereinbefore. In either case, the inlet read-out data are provisionally stored in the memory so as enough to have the necessary calculation time available at the side of the present machine. In the case of the hard style arrangement when adopted, similar memory means can be arranged within the correction circuit for the same purpose as above.

In the foregoingly set forth description of the correction circuit means, the ratio between the two kind-time signals has been adopted for the correction of read-out data. It is, however, also possible to adopt the difference between two kind-time signals instead of use of the foregoing signal ratio, although have not been specifically shown and described in the foregoing.

Further, in place of the CCD-line sensor used as the necessary line sensor in the foregoing embodiment, suitable solid state element, such as PDA, capable of reading the linearly successive image information.

Although, in the foregoing embodiment of the invention, such an image-reading apparatus; wherein the original document has been kept stationary, while the CCD-sensor is arranged movable, a reversed stop-and-move arrangement relationship can be adopted without departing the gist of the invention.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. An image reading apparatus, comprising:
    scanning means for an optical image;
    image sensor means for converting optical image data to electric data with the scanning of said scanning means, said image sensor means including photoelectric converters aligned one-dimensionally in the direction perpendicular to the scanning direction;
    signal generating means for generating serial signals every time said scanning means is driven for a predetermined distance;
    outputting means for outputting said electric data from said image sensor means in response to said signals generated by said signal generating means;
    detecting means for detecting the driving speed of said scanning means at every said predetermined distance;
    correcting means for correcting said electric data output by said outputting means in accordance with the driving speed detected by said detecting means;

comparator means for comparing said detected speed with a predetermined speed;

compensating means for compensating said output data to indicate higher image when said comparator mans judges that said speed is larger than the predetermined speed, and for compensating said output data to indicate lower density image when said comparator means judges that said detected speed is less than said predetermined speed.

2. An image reading apparatus according to claim 1, wherein said comparator means is a divider for calculating a ratio of said predetermined speed to said detected speed, and said compensating means is a multiplier for multiplying said output data by said ratio obtained by said divider.

3. An image reading apparatus, comprising:

scanning means for scanning an optical image;

image sensor means for converting optical image data to electric data with the scanning of said scanning means, said image sensor means including photoelectric converters aligned one-dimensionally in the direction perpendicular to the scanning direction;

signal generating means for generating serial signals every time said scanning means is driven for a predetermined distance;

outputting means for outputting said electric data from said image sensor means in response to said signals generated by said signal generating means;

detecting means for detecting the driving speed of said scanning at every said predetermined distance; and correcting means for correcting said electric data output by said outputting means in accordance with the driving speed detected by said detecting means;

wherein said scanning means is driven by a scanning motor, and said signals generated by said generating means are synchronized with said scanning motor.

4. An image reading apparatus comprising:

scanning means for scanning an optical image;

image sensor means for converting optical image data to electric data with the scanning of said scanning means, said image sensor means including photoelectric converters aligned one-dimensionally in the direction perpendicular to the scanning direction;

signal generating means for generating serial signals every time said scanning means is driven for an predetermined distance;

outputting means for outputting said electric data from said image sensor means in response to said signals generated by said signal generating means;

detecting means for detecting the driving speed of said scanning means at every said predetermined distance; and correcting means for correcting said electric data output by said outputting means in accordance with the driving speed detected by said detecting means;

wherein said detecting means measures a time interval of said signals generated by said generating means.

5. An image reading apparatus according to claim 4, wherein said detecting means comprising:

a clock means for generating clock pulses;

a timer means for counting said clock pulses, and said timer means is connected to said signal generating means and reset by generated signals from said generating means.

6. An image reading apparatus, comprising:

as platen on which an original to be read is placed;

an image sensor means for converting the image of the original placed on the platen to electric data, said image sensor including a plurality of photoelectric converters arranged linearly along the image plane;

as moving means for moving said image sensor means in the direction perpendicular to the longitudinal direction of said image sensor means;

a signal generating means for generating serial signals every time said image sensor means is moved for a predetermined distance by said moving means;

a detecting means for detecting the moving speed of said image sensor means at every said predetermined distance;

an outputting means for outputting said electric data from said image sensor means in response to said signals generated by said signal generating means; and a correcting means for correcting said electric data output by said outputting means in accordance with the moving speed detected by said detecting means.

7. An image reading apparatus according to claim 6, wherein said correcting means comprising:

a comparator for comparing said detecting speed with a predetermined speed;

a compensating means for compensating said output data to indicate higher density image when said comparator means judges that said detected speed is larger than the predetermined speed, and for compensating said output data to indicate lower density image when said comparator means judges that said detected speed is less than said predetermined speed.

8. An image reading apparatus according to claim 7, said comparator means is a divider for calculating a ratio of said predetermined speed to said detected speed, and said compensating means is a multiplier for multiplying said output data by said ratio obtained by said divider.

9. An image reading apparatus according to claim 6, wherein said moving means is driven by a motor, and said signals generated by said generating means are synchronized with said motor.

10. An image reading apparatus according to claim 6, wherein said detecting means measures a time interval of said signals generated by said generating means.

11. An image reading apparatus according to claim 10, wherein said detecting means comprising;

a clock means for generating clock pulses;

a timer means for counting said clock pulses, and said timer means is connected to said signal generating means and reset by generated signals from said generating means.

12. An image reading apparatus, comprising:

a platen on which an original to be read is placed;

a scanning means for scanning the original placed on said platen;

an image sensor means for converting optical image data of the original to electric data with the scanning of said scanning means, said image sensor means including photoelectric converters aligned one-dimensionally in the direction perpendicular to the scanning direction;

a signal generating means for generating serial signals every time said scanning means is driven for a predetermined distance;

an outputting means for outputting said electric data from said image sensor means in response to said signals generated by said signal generating means;

a detecting means for detecting the driving speed of said scanning means at every said predetermined distance;

a comparator means for comparing said detected speed with a predetermined speed;

an compensating means for compensating said output data to indicate higher density image when said comparator means judges that said detected speed is larger than the predetermined speed, and for compensating said output data to indicate lower density image when said comparator means judges that said detected speed is less than said predetermined speed.

13. An image apparatus according to claim 14, wherein said scanning means is driven by a scanning motor, and said signals generated by said generating means are synchronized with scanning motor.

14. An image reading apparatus according to claim 12, wherein said detecting means measures a time interval of said signals generated by said generating means.

15. An image reading apparatus according to claim 14, wherein said detecting means comprising:

a clock means for generating clock pulses;

a timer means for counting said clock pulses, and said timer means is connected to said signal generating means and reset by generated signals from said generating means.

* * * * *